US008000451B1

(12) United States Patent
Aubuchon et al.

(10) Patent No.: US 8,000,451 B1
(45) Date of Patent: Aug. 16, 2011

(54) SYSTEM AND METHOD FOR MANAGING NETWORK SWITCH TRANSACTION DEPENDENCIES

(75) Inventors: Kenneth J. Aubuchon, Lenexa, KS (US); Walter J. Clark, Lawrence, KS (US); Kay E. Mitchell, Kansas City, MO (US); Kenneth K. Muiruri, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1890 days.

(21) Appl. No.: 11/053,607

(22) Filed: Feb. 8, 2005

(51) Int. Cl.
*H04M 1/24* (2006.01)

(52) U.S. Cl. ............. 379/15.03; 379/201.12; 379/10.01; 379/10.03

(58) Field of Classification Search .................. 709/225; 370/419; 379/10.01, 15.03, 201.12
See application file for complete search history.

(56) References Cited

U.S. PATENT DOCUMENTS

| | | | | |
|---|---|---|---|---|
| 5,528,677 | A | 6/1996 | Butler et al. | 379/196 |
| 5,761,432 | A | 6/1998 | Bergholm et al. | 709/226 |
| 5,903,891 | A * | 5/1999 | Chen et al. | 1/1 |
| 6,049,590 | A * | 4/2000 | Bond et al. | 379/9.01 |
| 6,668,053 | B1 * | 12/2003 | Doleac et al. | 379/243 |
| 6,963,916 | B1 * | 11/2005 | Pugaczewski et al. | 709/227 |
| 7,080,144 | B2 * | 7/2006 | Boehmke | 709/225 |
| 7,219,339 | B1 * | 5/2007 | Goyal et al. | 717/143 |

* cited by examiner

*Primary Examiner* — Ahmad F Matar
*Assistant Examiner* — Antim Shah

(57) ABSTRACT

A system for populating a telecommunications switch with data for call processing is provided. The system includes a map of a transaction and a component operable to process the map. The map of the transaction has commands to be sent to provision at least one telecommunications switch. The transaction commands include at least some parent and child commands. The child commands have processing that is dependent on one or more related parent commands. The map identifies dependencies between the child commands and related parent commands. The component is operable to process the map such that the parent commands that have dependent child commands are communicated to the appropriate telecommunications switches before the dependent child commands.

16 Claims, 3 Drawing Sheets

SYSTEM AND METHOD FOR MANAGING NETWORK SWITCH TRANSACTION DEPENDENCIES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to the field of provisioning telecommunication networks and more particularly, but not by way of limitation, to a system and method for managing telecommunication network switch transaction dependencies.

BACKGROUND OF THE INVENTION

Communication or telecommunication networks, as used herein, may include wireless or mobile networks, public switched telephone networks, and/or public data networks. These communication networks are comprised of various components for managing network traffic. These components may include network switches which may be employed for managing call traffic such as by connecting calls and tracking call information.

Modern switches are more akin to computers than their older mechanical namesakes and are programmable with regard to call connectivity and transaction logging functionality. As services change and new services become available, the switches are provisioned or enabled for managing the new services and related information tracking by programming or reprogramming the switch. This programming may be accomplished, for example, by a populating the switches with data for call processing. Telecommunications management and administration systems located at the telephone company, for example, communicate switch commands to the switch to provision the switch for call processing.

SUMMARY OF THE INVENTION

According to one embodiment, a system for populating a telecommunications switch with data for call processing is provided. The system includes a map of a transaction and a component operable to process the map. The map of the transaction has commands to be sent to provision at least one telecommunications switch. The transaction commands include at least some parent and child commands. The child commands have processing that is dependent on one or more related parent commands. The map identifies dependencies between the child commands and related parent commands. The component is operable to process the map such that the parent commands that have dependent child commands are communicated to the appropriate telecommunication switches before the dependent child commands.

In another embodiment, a system for populating a telecommunications switch with data for call processing is provided.

The system includes a map of a transaction, a mapping component, and a processing component. The map of the transaction includes commands to be sent to provision at least one telecommunications switch. The transaction commands include at least some parent and child commands. The child commands have processing that is dependent on one or more related parent commands. The map identifies dependencies between the child commands and related parent commands. The map includes a text string having one or more parent commands, an identifier identifying one or more child commands that are dependent on the one or more parent commands for processing, and one or more child commands. The mapping component generates the map of the transactions. The processing component processes the map such that the parent commands that have dependent child commands are communicated to the appropriate telecommunication switches before the dependent child commands. The processing component includes a multi-threaded application that is operable to send all of the parent commands at a same level to all of the appropriate telecommunications switches at substantially the same time.

In other embodiments, a method for provisioning a telecommunications switch is provided. The method includes determining a transaction having commands to be sent to provision at least one telecommunications switch. The transaction commands include at least some parent and child commands. The child commands have processing that is dependent on one or more related parent commands. The method includes arranging the transaction commands into a map identifying dependencies between the child commands and related parent commands. The method also includes processing the map such that the parent commands that have dependent child commands are communicated to the appropriate telecommunications switches before the dependent child commands.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Transaction data to provision telecommunications switches for call processing may include both independent switch commands and related switch commands. Independent switch commands may be single commands that can be provisioned directly to telecommunications switches without regard to the processing of previous or subsequent commands in the switches. Related commands include those that have relationships to other commands, such as parent/child relationships, and which must be processed in a particular order to properly provision the telecommunications switch. For example, child commands are dependent on their related parent command and the parent command must be processed in the switch before the child command, or the child command will not process or load to the switch properly.

The present disclosure provides a system to manage transaction dependencies for related commands for processing to telecommunications switches. The system maps and processes commands based on the identified hierarchical dependencies so that, for example, all parent commands are processed before their related child commands. In one embodiment, the present disclosure provides a hierarchal mapping technique that uses parentheses to denote parent/child relationships in switch commands to be processed for provisioning the telecommunications switches. The present system not only provides for processing commands while taking into account any required dependencies, the system is further operable to provide prompt processing of commands that do not have dependencies.

Figure 1:
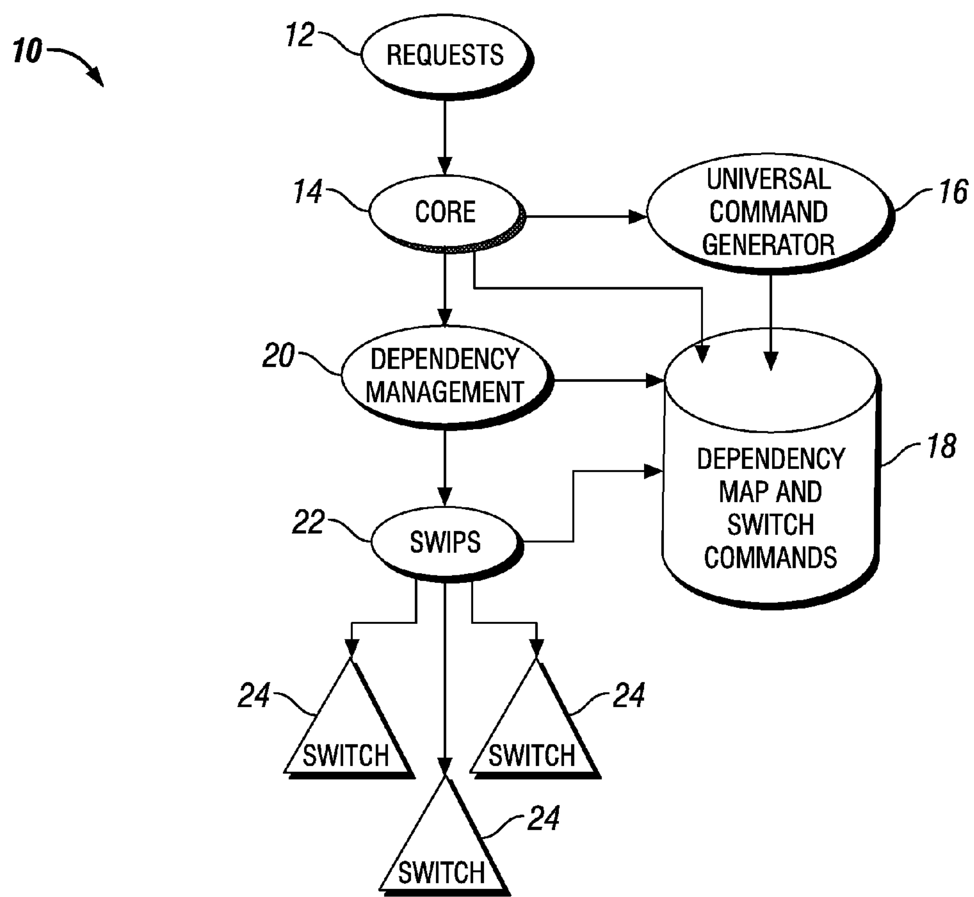
FIG. 1 is a diagram of one embodiment of a system for managing network switch transaction dependencies to enable network services.

FIG. 1 is a diagram illustrating a system 10 for provisioning a telecommunications network to deliver services. The system 10 may be one or more computer systems, applications, programs or devices used to support a telecommunications network. Although the system 10 may include a number of other components for supporting an organization that provides network telecommunication services, only the components necessary to implement the present disclosure will be discussed for purposes of brevity.

A request layer 12 of the system 10 receives requests for services from upstream systems (not shown) such as customer information systems. The request layer 12 may represent one or more systems or applications operable for communicating, via various interfaces, with the upstream service requesting systems. These upstream systems may be operated by customer service representatives who communicate with customers requesting network services such as toll free services, virtual private networks, subscriptions, revenue trunks, or other services which may be implemented on the telecommunications network. Examples of requests from other upstream systems include trunking requests from facilities management systems. The request layer 12 may also receive requests for services, such as these previously described and others via a user interface of applications such as service delivery platforms used to directly support network management and provisioning services.

In any event, the request layer 12 is operable for receiving the requests for services and performing edits on the received data such as syntax checking, error checking and may transform the data into standardized formats for use throughout the system 10. The request layer 12 stores the checked and transformed service requests in data stores (not shown) for subsequent retrieval. Service requests that fail the request layer 12 checks, such as for syntax or other reasons, may be returned to the requesting system or application, such as the customer information system for correction and resubmission. The service requests are then made available to a core 14 of the system 10.

The core 14 maintains the fundamental information necessary for the telecommunications network, such as business logic, network models, data tables of systems configurations, and so on. The core 14 receives the service requests after the high-level checking and transformation has been performed by the request layer 12. The core 14 is operable for performing lower-level editing and syntax checking of the service requests. For example, upon receiving a change request, the core 14 is able to analyze the change request to make sure that sufficient data is present for the change.

The core 14 maintains referential integrity information on the network and uses this information to determine whether all the necessary data is available to enable the service as well as to identify any related or support data or systems that will be necessary to provide the requested service. Since the core 14 maintains the contents of the existing telecommunications network, it is able to compare the request to the systems and services that currently exist in the network. In this way, the core 14 is able to verify that the requested service can in fact be enabled. The core 14 is further able to determine which network elements, such as switches, must be updated to enable the service request.

Once the core 14 has manipulated the service request data and gathered all supplemental data necessary to turn the request into commands for one or more network elements or switches, the core 14 makes this information available to an appropriate universal command generator 16 (UCG). Although only one universal command generator 16 is illustrated, the system 10 may include multiple different UCGs, for example one for each specific element or switch type in the telecommunications network. The universal command generator 16 receives the information from the core 14 and is operable to turn the request for services into a series of smaller commands. The universal command generator 16, using the data made available by the core 14, actually builds the switch commands formatted for the destination switch.

The core 14 and the universal command generator 16 maintain sufficient information to identify the relationships or dependencies of the switch commands to enable the particular service. Furthermore, because the core 14 maintains information on the physical telecommunications network, the core 14 may be operable for determining whether similar work has already been implemented on the various parts of the network. Where similar work has already been performed, the core 14 may only point to the prior work, such as data tables, to implement the requested service. In one embodiment, the switch commands and their dependencies are generated solely by the universal command generator 16, but in other embodiments the core 14 or the combination of components of the core 14 and components of the universal command generator 16 may work together to generate these commands and identify the dependencies. In another embodiment, portions of the core 14 and universal command generator 16 may be combined or repurposed into one or more applications for building the switch commands and identifying the dependencies.

After the switch commands are constructed, the switch commands may be stored in a data store 18 accessible to various components of the system 10. In one embodiment, a dependency management component 20 may be used either alone or in combination with the core 14 and/or the universal command generator 16 to identify the dependencies and to prepare the switch commands for communication to the switches. Regardless of whether the dependency management component 20, core 14, or universal command generator 16 or combinations of these systems are used, the data store 18 maintains the switch commands necessary to provision the requested service. The switch commands in the data store 18 are then available to one or more of these systems such that the commands or system receiving the commands can identify the dependencies for provisioning the service.

Figure 2:
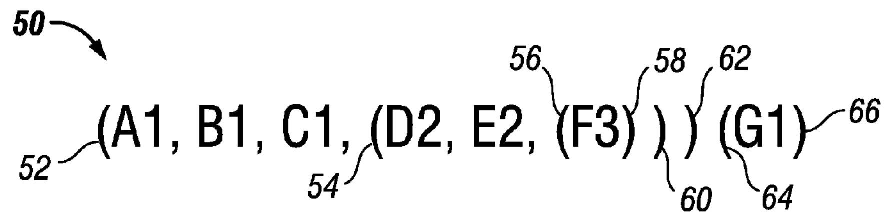
FIG. 2 illustrates an exemplary parenthetical including keys related to switch commands and identifiers identifying the relationships between the switch commands, according to one embodiment of the present disclosure.
Figure 3:
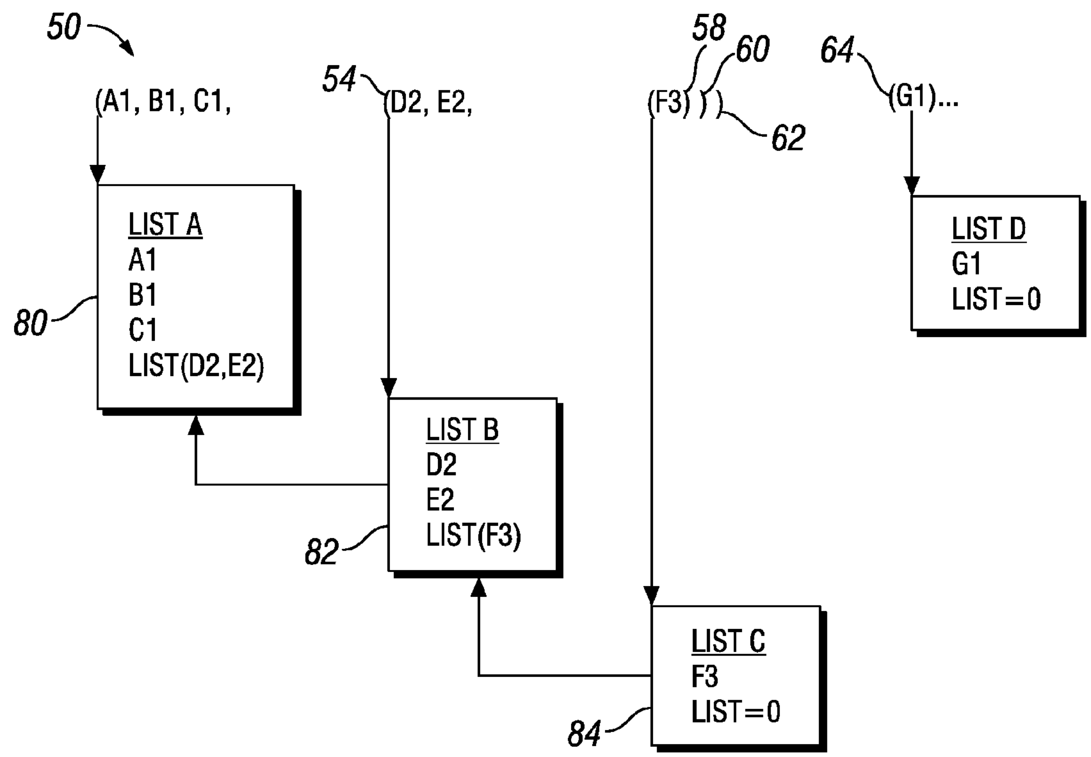
FIG. 3 illustrates parsing the parenthetical shown in FIG. 2 to map lists based on the hierarchical relationships of the switch commands, according to another embodiment.

FIGS. 2 and 3 illustrate an exemplary map that identifies these dependencies and the related switch commands, but is should be appreciated that other techniques may be used and the present disclosure should not be limited to the specific parenthetical illustrated in these figures. As used herein, requested service may be identified or referred to as a single or multiple transactions or a single or multiple units of work, and such unit of work may include a plurality of switch commands some of which have related dependencies. Thus, for one or more requested services, the data store 18 may include multiple units of work including a plurality of switch commands and identifying the dependencies of the switch commands within the particular unit of work.

As previously discussed, FIG. 2 illustrates an exemplary parenthetical 50 or map identifying at least one unit of work. The parenthetical 50 is a text string whose characters will be described from left to right for simplicity. The parenthetical 50 includes a first identifier 52, in this case an open parenthesis to indicate the beginning of the unit of work. A1, B1, and C1 represent keys related to switch commands. In one embodiment, the keys may be the actual switch commands, while in the preferred embodiment the keys reference the location of the actual switch command, which may be located in a table, such as the data store 18. Keys A1, B1, and C1 represent parent commands and are independent of one another and their commands may be sent to the switch at the same time.

The second identifier 54, which is another open parenthesis, indicates that the subsequent keys D2 and E2 depend on the parent keys A1, B1, and C1 and that the parent keys A1, B1, and C1 must be processed to the switch prior to keys D2 and E2. If the keys are not processed in this order, keys D2 and E2 will not process correctly to the switch. The third identifier 56, which in this embodiment is another open parenthesis, indicates another dependency where F3 is a child dependent on the keys D2 and E2. Thus, key F3 depends on keys D2 and E2 being processed to the switch before key F3 can be sent to the switch.

The parenthetical 50 includes a fourth identifier 58 which is a closed parenthesis that indicates the end of the list of child dependencies for keys D2 and E2. A fifth identifier 60, which is another closed parenthesis, indicates an end of the list of child dependencies of parents A1, B1, and C1. A final identifier 62, which is another closed parenthesis, indicates an end of the unit of work. Any subsequent identifiers or keys do not have dependencies or relationship to the former keys. For example, identifiers 64 and 66 are open and closed parentheses surrounding a key G1 which represents a single command unit of work.

As previously discussed, parenthetical 50 represents one embodiment of the present disclosure where the switch commands may be mapped in various sequences with identifiers to identify the dependencies of the switch commands. Although open and closed parentheses are illustrated, any text, entry, or character, may be used, such as but not limited to any of the ASCII (American Standard Code for Information Interchange) characters. Also, the particular organization or order, whether from left to right or right to left is also one of choice. Further, the commands and dependencies may be arranged in a database where the parent keys are maintained in the first table with an index related to the child keys, which are maintained in a second table and so on.

Thus, while the present parenthetical 50 is the currently preferred embodiment, the present disclosure should not be limited to this embodiment and other techniques for mapping or identifying the transactions and commands are within the spirit and scope of the present disclosure. As discussed, the system 10, such as the core 14, the universal command generator 16, and/or the dependency management component 20 or various combinations thereof may build the parenthetical 50. This includes constructing the keys and the identifiers identifying the dependencies, as well as, storing the parenthetical 50 in a table, such as the data store 18. Where the parenthetical 50 does not include the actual switch commands, the data store 18 may also include a separate table maintaining the actual switch commands and an index or other means for maintaining the relationship between the keys and the actual switch commands.

Referring now to FIG. 3, the parenthetical 50 is shown as being used to create lists maintaining keys at each level of dependency within the parenthetical 50. For example, a list A 80 identifies the parent keys A1, B1, and C1 and also maintains the association of the child keys by inserting a listing of children into the list A 80 so that the parent is always aware of the children. As illustrated, every time a parenthesis is encountered, a new list is created. For example, when the second identifier 54 is encountered, a list B 82 is created including the child keys D2 and E2 and listing the children of these keys, here key F3. List C 84 includes only the child key F3 and may note that there are no children of F3 or may be left blank in other embodiments.

The process of generating the lists from the parenthetical 50 may be accomplished by the system 10 by creating a new list each time an open parenthesis is encountered and closing the most recently created list upon encountering each closed parenthesis. Thus, identifier 58 signals an end or closure for list C 84, identifier 60 indicates the end of list B 82, and identifier 62 indicates the end of list A 80 and the end of the unit of work as well. The subsequent open parenthesis identifier 64 indicates the start of a new list and a new unit of work and so on.

A programming technique, such a C++ recursion, to create the parent/child maps may be used to continue parsing the dependency of the string. The recursive function will allow maps to be built and to maintain the linking of the entire dependency for the various lists. Each of the lists A, B, and C 80, 82, and 84 respectively may represent lists that may be used for processing keys to the switches. In other embodiments, the keys or actual commands may be or organized using other systems of tables, data stores, or in other manners to achieve this functionality, all of which are within the spirit and scope of the present disclosure. However, in the preferred embodiment, a standard template library (STL) map or list may be used to arrange the dependencies based on the parent/child relationship.

It should be apparent that the parenthetical 50 and lists A, B, and C 80, 82 and 84 should not be limited to the illustrated or discussed numbers of parent commands, child commands, and/or identifiers, since the parenthetical 50 is operable for organizing large numbers of commands and identifier. The parenthetical 50 may maintain switch commands and dependency maps of various layers or hierarchical levels. Also, the present system may be extended so that the identifiers identify relationships between units of work or transactions, or relationships to other information including whether the commands relate to single or multiple switches, for example.

Referring back to FIG. 1, the lists or maps are processed to the switches in the parent/child relationship order. In one embodiment, the core 14, the universal command generator 16, and/or the dependency management component 20 or combinations thereof may be programmed to process the dependency maps with a threading mechanism. The threading mechanism includes a scheme of mutexes and conditional variables to control the flow of execution. The programming operates so that threads spawned will not create a race condition to the same memory space during processing, which may occur since they may be sharing variables. To avoid this, threads will be used with the help of mutexes which allow mutual exclusion by acquiring and locking some memory space before a thread enters a processing critical state. In conjunction with mutexes, the process may be programmed to use conditional variables which will enable the release of threads after certain conditions have been met.

The conditional variable functions to be used are wait ( ) and signal ( ) which will enable the notification that a thread has completed its processing. Using these techniques, the threads are allowed to process within the confines of the dependencies and avoid the sequencing of commands regardless of their dependencies. This also allows for the commands that do not have dependencies to continue processing in different switches without being held up by other processes that have no dependencies with them.

The system also maintains a failover mechanism that is operable to roll-back any commands having dependencies that fail. For example, a parent may be rolled-back where a child fails or a child whose parent failed may not be executed since a child relies on the parent processes for proper execution. These are only some examples of the functionality provided by failover mechanism and other capabilities may be provided.

By enabling recursive processing, execution will continue until the entire unit of work, such as the combination of maps or lists has been completed. During execution these commands may be sent to a SWIPS 22 (switch work in-progress) for processing to switches 24. Where the keys or commands in the maps or lists do not comprise the switch commands, the SWIPS 22 will use the keys to read from the data store 18 and extract the actual switch commands to be processed to the switches 24.

The system 10 is operable for processing the commands substantially simultaneously using threaded programming, for example, to one or more switches. Thus, referring to parenthetical 50 in FIG. 2, commands A1, B1, and C1 may be sent at the same time to the appropriate switches 24 for processing. Also, the parenthetical 50 or other systems may identify multiple switches to which certain commands must be processed. For example, command A1 might be processed to multiple switches simultaneously to enable the requested service.

In the preferred embodiment, the processing is accomplished, at least in part, by an application having multi-threaded capabilities. Furthermore, the present system is operable for processing switch commands that have no dependencies or relationships without delay, which significantly increases the throughput of switch command processing while maintaining the appropriate hierarchy of commands that do have dependency relationships.

Although switch provisioning is discussed in detail herein, the present system may be used to provision not only network elements or switches, but also other network devices. Examples of other network devices include, but are not limited to, access tandems and service control points.

Figure 4:
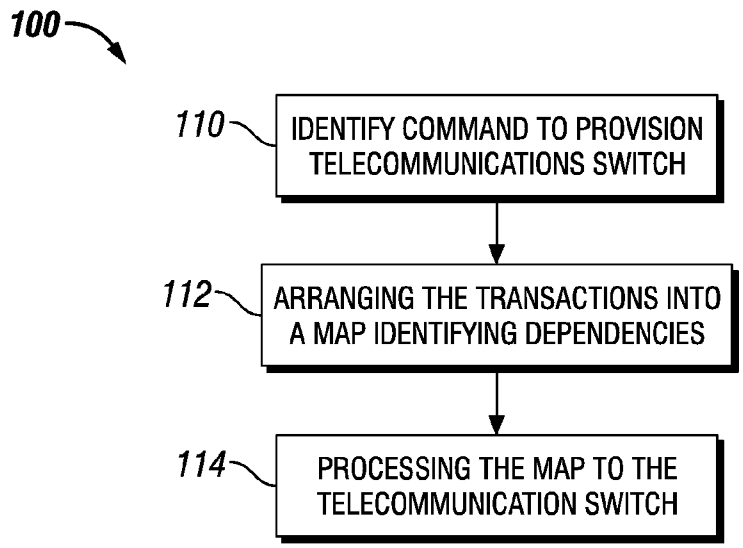
FIG. 4 is a flow-chart illustrating a method for managing the dependencies between network switch transaction for provisioning services to the telecommunications network.

Referring now to FIG. 4, a flowchart illustrating a method 100 for provisioning a telecommunications switch is provided. The method includes, at a box 110, identifying a transaction having commands to be sent to at least one switch to enable services on a network. As previously described, the transaction may also refer to a unit of work or other set or subset of switch commands to enable a requested service. The transaction commands include at least some parent and child commands where the child commands have processing that is dependent on one or more related parent commands.

At a block 112, the method includes arranging the transaction commands into a map identifying dependencies. This may include using the system 10 to generate the parenthetical 50 and/or the maps 80, 82, and 84, or other presentation of the keys or switch commands with information identifying the dependencies. In some embodiments this may include generating the specific maps 80, 82, and 84 maintaining a list of switch commands at each hierarchically level of the transaction or unit of work.

At a block 114, the method includes processing the lists or maps to the switches. The method includes processing these commands so that the parent commands that have dependent child commands are communicated to the telecommunication switches before the dependent child commands are processed to the switches. The processing may include parsing the parenthetical 50 into the maps or lists, or may only include processing these specific maps or lists to the switches. This block 114 may also include consideration for failed commands to prevent processing, for example, of dependent commands whose parent commands failed to process.

Figure 5:
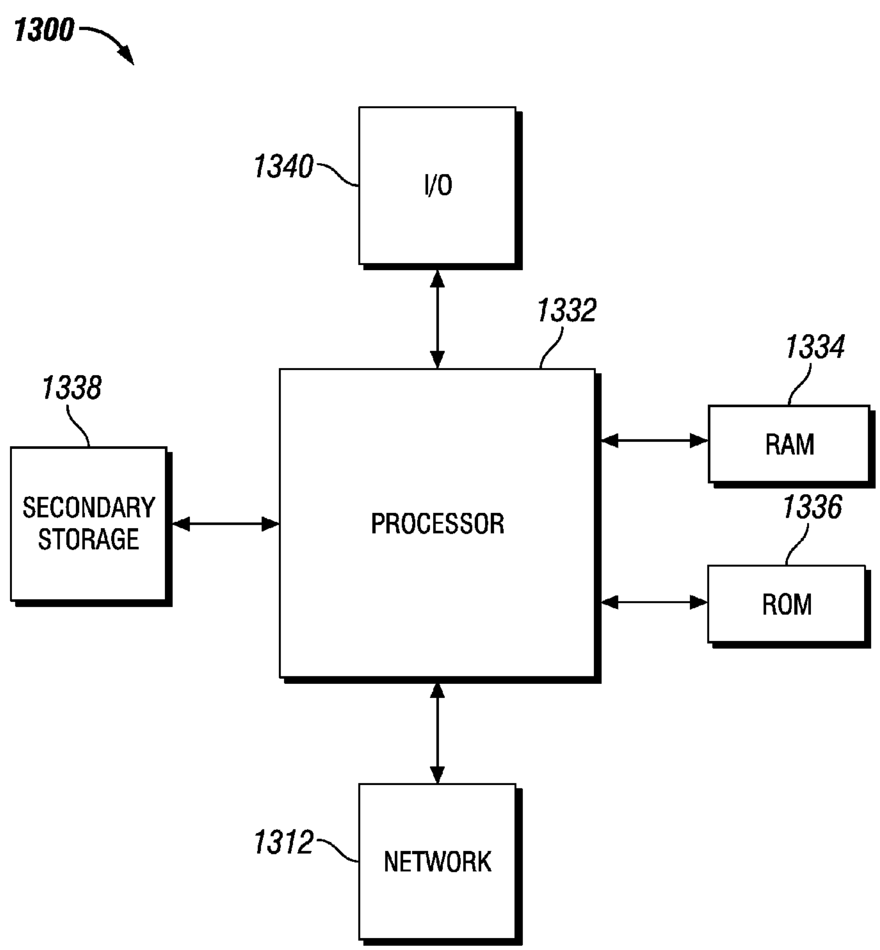
FIG. 5 is a block diagram of an exemplary computer system operable for implementing portions of the system of the present disclosure.

The system and method described above may generally be implemented on a variety of different computer systems. FIG. 5 illustrates a typical, general-purpose computer system suitable for implementing the present disclosure. The computer system 1300 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk, flash memory, CD-ROM, USB drive, or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, flash memory, CD-ROM, USB drives, floppy discs, carrier waves, and the like.

While several embodiments have been provided in the present disclosure, it should be understood that the system and method for managing network switch transaction dependencies may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by on skilled in the art and could be made without departing from the spirit and scope disclosed herein.

What is claimed is:

1. A system for populating a telecommunications switch with data for call processing, the system comprising:

a dependency map of a transaction having commands to be sent to provision at least one telecommunications switch, the commands executable in the at least one telecommunications switch, the map organizing the commands into a hierarchy of command levels comprising a parent command level and at least one child command level, wherein each command at each child command level has processing dependent upon at least one command at a higher level in the hierarchy, and wherein the map is further defined as a text string that includes the commands and at least one identifier identifying dependencies between the commands; and a component operable to process the map such that commands at the parent command level are communicated to the at least one telecommunications switch before commands at the at least one child command level, wherein the component is a multi-threaded application operable to send a plurality of commands at one level in the hierarchy of command levels to the at least one telecommunications switch at substantially the same time, and wherein the component holds processing of a child command at the at least one child command level until confirming that the telecommunications switch has processed the at least one command at the higher level from which the child command depends.

2. The system of claim 1, further comprising a map component operable to generate the map of the transactions having commands to be sent to provision at least one telecommunications switch, the map component operable to organize the transaction to identify the dependencies between the parent and child commands.

3. The system of claim 1, wherein the identifier is a text character.

4. The system of claim 3, wherein the text character is further defined as a parenthesis.

5. The system of claim 1, wherein the map is further defined as a text string including:

a first identifier identifying a start of a first transaction;

a first parent command for the telecommunication switch, the first parent command provided in the text string sequentially following the first identifier;

a second parent command for the telecommunications switch, the second parent command provided in the text string sequentially following the first parent string;

a second identifier identifying a start of child commands dependent on the first and second parent command;

a first child command for the telecommunications switch, the first child command provided in the text string sequentially following the second identifier;

a third identifier identifying an end of the child commands dependent on the first and second parent command; and a fourth identifier identifying an end of a first transaction.

6. The system of claim 5, wherein the first, second, third, and fourth identifiers are defined as text characters.

7. The system of claim 5, wherein the first and second identifiers are defined as an open parenthesis and the third and fourth identifiers are defined as a close parenthesis.

8. The system of claim 1, further comprising the component operable to identify and process independent commands that do not have related dependent commands.

9. A method for provisioning a telecommunications switch, the method comprising:

determining a transaction having commands to be sent to provision at least one telecommunications switch;

organizing the commands into a hierarchy of command levels comprising a parent command level and at least one child command level, wherein each command at each child command level has processing dependent upon at least one command at a higher level in the hierarchy; and processing the map such that commands at the parent command level are communicated to the at least one telecommunications switch before commands at the at least one child command level, wherein the processing is by a multi-threaded application operable to send a plurality of commands at one level in the hierarchy of command levels to the at least one telecommunications switch at substantially the same time, and wherein processing of a child command at the at least one child command level is delayed until confirming that the telecommunications switch has processed the at least one command at the higher level from which the child command depends; and processing commands having no dependent relationships without delaying processing due to the dependencies of other parent and child commands.

10. The method of claim 9, further comprising holding processing of a first child command dependent on the first parent command and a second child command dependent on the second parent command until confirming that the switch has successfully processed the first and second parent command.

11. A system for populating a telecommunications switch with data for call processing, the system comprising:

a dependency map of a transaction having commands to be sent to provision at least one telecommunications switch, the map including a text string including:

one or more parent and child commands, an identifier identifying one or more child commands dependent on the one or more parent commands for processing;

a mapping component operable to generate the map of the transaction by organizing the commands into a hierarchy of command levels comprising a parent command level and at least one child command level, wherein each command at each child command level has processing dependent upon at least one command at a higher level in the hierarchy; and a processing component operable to process the map such that commands at the parent command level are communicated to the at least one telecommunications switch before commands at the at least one child command level, the processing component including a multi-threaded application operable to send a plurality of commands at one level to the at least one telecommunications switch at substantially the same time, and wherein the component holds processing of a child command at the at least one child command level until confirming that the telecommunications switch has processed the at least one command at the higher level from which the child command depends.

12. The system of claim 11, wherein the parent and child commands include actual telecommunications switch commands.

13. The system of claim 11, wherein the parent and child commands include pointers to actual telecommunications switch commands.

14. The system of claim 11, wherein the dependency map comprises independent commands that do not have related dependent commands.

15. The system of claim 14, wherein the processing component is operable to further process the independent commands without delay.

16. The system of claim 1, wherein the component is further configured to roll-back processing of previously processed command when a command from which the previously processed command depends has not successfully processed.

* * * * *